US009460094B1

(12) United States Patent
Nosack et al.

(10) Patent No.: US 9,460,094 B1
(45) Date of Patent: Oct. 4, 2016

(54) SYSTEM AND METHOD FOR DETERMINING A NEAREST NETWORK RESOURCE USING GPS COORDINATES

(75) Inventors: Kurt Nosack, Payson, UT (US); Christopher Jean Seiler, Provo, UT (US); Ty Ellis, Elk Ridge, UT (US)

(73) Assignee: Novell, Inc., Provo, UT (US)

( * ) Notice: Subject to any disclaimer, the term of this patent is extended or adjusted under 35 U.S.C. 154(b) by 1196 days.

(21) Appl. No.: 11/030,904

(22) Filed: Jan. 10, 2005

(51) Int. Cl.
*G06F 7/00* (2006.01)
*G06F 17/30* (2006.01)

(52) U.S. Cl.
CPC .............................. *G06F 17/30041* (2013.01)

(58) Field of Classification Search
USPC ...................................... 707/100, 104.1, 770
See application file for complete search history.

(56) References Cited

U.S. PATENT DOCUMENTS

| | | | |
|---|---|---|---|
| 5,581,261 A | 12/1996 | Hickman et al. ............ 342/385 |
| 6,137,783 A * | 10/2000 | Sallberg ....................... 370/316 |
| 6,208,857 B1 * | 3/2001 | Agre et al. ................... 455/428 |
| 6,243,039 B1 * | 6/2001 | Elliot ...................... G01S 19/16 342/357.74 |
| 6,453,237 B1 | 9/2002 | Fuchs et al. ................ 701/213 |
| 6,477,581 B1 | 11/2002 | Carpenter et al. ........... 709/238 |
| 6,501,421 B1 * | 12/2002 | Dutta .................. G06F 17/3087 342/357.22 |
| 6,539,232 B2 | 3/2003 | Hendrey et al. ............ 455/456 |
| 6,542,748 B2 | 4/2003 | Hendrey et al. ............ 455/456 |
| 6,643,704 B1 | 11/2003 | Timms et al. .............. 709/239 |
| 6,756,918 B2 | 6/2004 | Fomukong .................. 340/988 |
| 6,897,805 B2 * | 5/2005 | Bajikar ..................... 342/357.06 |
| 6,937,569 B1 * | 8/2005 | Sarkar ..................... H04L 45/00 370/238 |
| 6,968,179 B1 | 11/2005 | De Vries .................... 455/414.1 |
| 7,133,664 B2 * | 11/2006 | Bahl ........................ H04W 4/02 455/414.1 |
| 7,139,820 B1 * | 11/2006 | O'Toole, Jr. ........... H04L 63/123 701/468 |
| 7,143,171 B2 * | 11/2006 | Eriksson et al. .............. 709/227 |
| 7,257,411 B2 * | 8/2007 | Gwon .................... G01S 5/0252 455/115.1 |
| 7,336,928 B2 | 2/2008 | Paalasmaa et al. .......... 455/41.2 |
| 7,499,998 B2 * | 3/2009 | Toebes et al. ................ 709/225 |
| 7,643,835 B1 | 1/2010 | Nosack et al. ............. 455/456.3 |
| 2001/0047407 A1 * | 11/2001 | Moore et al. ................ 709/223 |
| 2002/0013870 A1 | 1/2002 | Aoki et al. ..................... 710/36 |
| 2002/0052751 A1 | 5/2002 | Ebata ............................... 705/1 |
| 2002/0058519 A1 * | 5/2002 | Nagahara ................ H04L 29/06 455/456.3 |
| 2002/0062263 A1 | 5/2002 | Katou ............................. 705/26 |
| 2002/0072855 A1 * | 6/2002 | Fuchs et al. .................. 701/213 |
| 2002/0077142 A1 * | 6/2002 | Sato et al. .................... 455/525 |
| 2002/0087522 A1 * | 7/2002 | MacGregor et al. ............. 707/3 |
| 2002/0133597 A1 * | 9/2002 | Jhingan ................... H04L 67/30 709/228 |
| 2003/0097564 A1 * | 5/2003 | Tewari .................... H04L 12/14 713/171 |
| 2004/0125401 A1 * | 7/2004 | Earl .................... H04N 1/00188 358/1.15 |
| 2005/0080786 A1 * | 4/2005 | Fish ..................... G06F 17/3087 |
| 2005/0124319 A1 | 6/2005 | Williams et al. ............. 455/411 |
| 2005/0180319 A1 * | 8/2005 | Hutnik et al. ................ 370/229 |
| 2005/0188399 A1 | 8/2005 | Tischer .......................... 725/34 |
| 2005/0239477 A1 | 10/2005 | Kim et al. ................. 455/456.1 |
| 2007/0004424 A1 | 1/2007 | Sheen et al. ............... 455/456.1 |
| 2007/0032247 A1 | 2/2007 | Shaffer et al. ............. 455/456.1 |

* cited by examiner

*Primary Examiner* — Tony Mahmoudi
*Assistant Examiner* — Michael Le
(74) *Attorney, Agent, or Firm* — Schwegman Lundberg & Woessner, P.A.

(57) ABSTRACT

A system and method are provided for determining a nearest network resource using GPS coordinates. A GPS enabled computer device may obtain its location by requesting its GPS location. A list of network servers storing the desired data may be obtained by the computer system and the distance between each of the servers and the computer device may be calculated. The system then connects to the resource having the shortest distance without requiring a user to know and decide which server is closest to their location.

13 Claims, 4 Drawing Sheets

SYSTEM AND METHOD FOR DETERMINING A NEAREST NETWORK RESOURCE USING GPS COORDINATES

FIELD OF THE INVENTION

The invention relates to determining a nearest network resource using a global positioning system.

BACKGROUND OF THE INVENTION

Mobile computing devices are prevalent today. Users often travel to various locations for business and/or pleasure, and often need to retrieve data from one or more networks. The data is often stored on more than one server and the servers are often located in various geographic locations. Thus, a user wishing to connect to a network must decide which server to connect to.

Although several methods exist for determining which network resource to connect to, these methods suffer from a number of drawbacks. For example, some methods calculate the response time for a number of available servers, employ subnet masks, and/or force users to choose an appropriate server from a list. It will be appreciated that the determination of a response time for each server in a sophisticated communication network employing numerous servers can be quite time consuming. Furthermore, forcing the user to choose a server can be complicated and possibly confusing to the user. If the user is traveling, for example, to a location in the Midwest, and servers are available in both the east and the west, the user would have to make a determination of which location is closer.

Other methods and systems include the user of dedicated network elements, such as, for example, redirecting servers, to provide options to the user indicating the most appropriate servers to connect to. It will be appreciated that the user of such redirecting servers require network integration, ties up network resources, and requires the user device to communicate with the redirecting server in addition to sustaining its communications session with a network server.

SUMMARY OF THE INVENTION

According to various embodiments of the present invention, a mechanism is provided for determining a nearest network server using location information obtained through a global positioning system (GPS). Many network resources use multiple servers to store information that a user of a computer device may wish to access. This is particularly prevalent with mobile devices such as laptop computers. The system and method of the present invention enables the nearest network server to be automatically determined using a global positioning system. The user need not know which particular server is closest to their present location before making a connection.

The system may include at least some or all of the following components. A location discovery module may be used by a device to determine its location. Using a global positioning system, the location discovery module may determine the GPS coordinates of the device. A distance calculation module may be used to determine the distance between the device and one or more available servers. A connections module may be used to manage the connections to the one or more servers.

According to various embodiments of the invention, a user may request to connect a computer device to a network. If the computer device is GPS enabled or can otherwise connect to a GPS satellite, the device may automatically determine the nearest network server. The user may then be connected to the network without requiring the user to decide which server would provide the best connection.

The GPS enabled computer device contacts one or more GPS satellites, as necessary, to determine a location of the device. The computer device also obtains a list of servers where the needed information may be accessed. The computer device then calculates the distance between its discovered location and each server wherein the information may be accessed. The computer device then attempts to connect to the server that is the shortest distance from its location. If the computer device is unable to connect to the server having the shortest distance, the computer device continues to try other servers from the list, in the order of shortest distance.

While it is usually optimal to connect to the closest server, choosing based on actual distance may not always produce the best connection. This may be due to, for example, the network topology. Thus, according to some embodiments of the invention, the device may use an additional mechanism to determine a response time of a number of servers having the shortest distance. The device may then choose to connect to the server, among those having the shortest actual distance, which also has the fastest response time.

These and other objects, features, and advantages of the invention will be apparent through the following detailed description and the drawings attached hereto. It is also to be understood that both the foregoing general description and the following detailed description are exemplary and not restrictive of the scope of the invention.

DETAILED DESCRIPTION OF PREFERRED EMBODIMENTS

Figure 1:
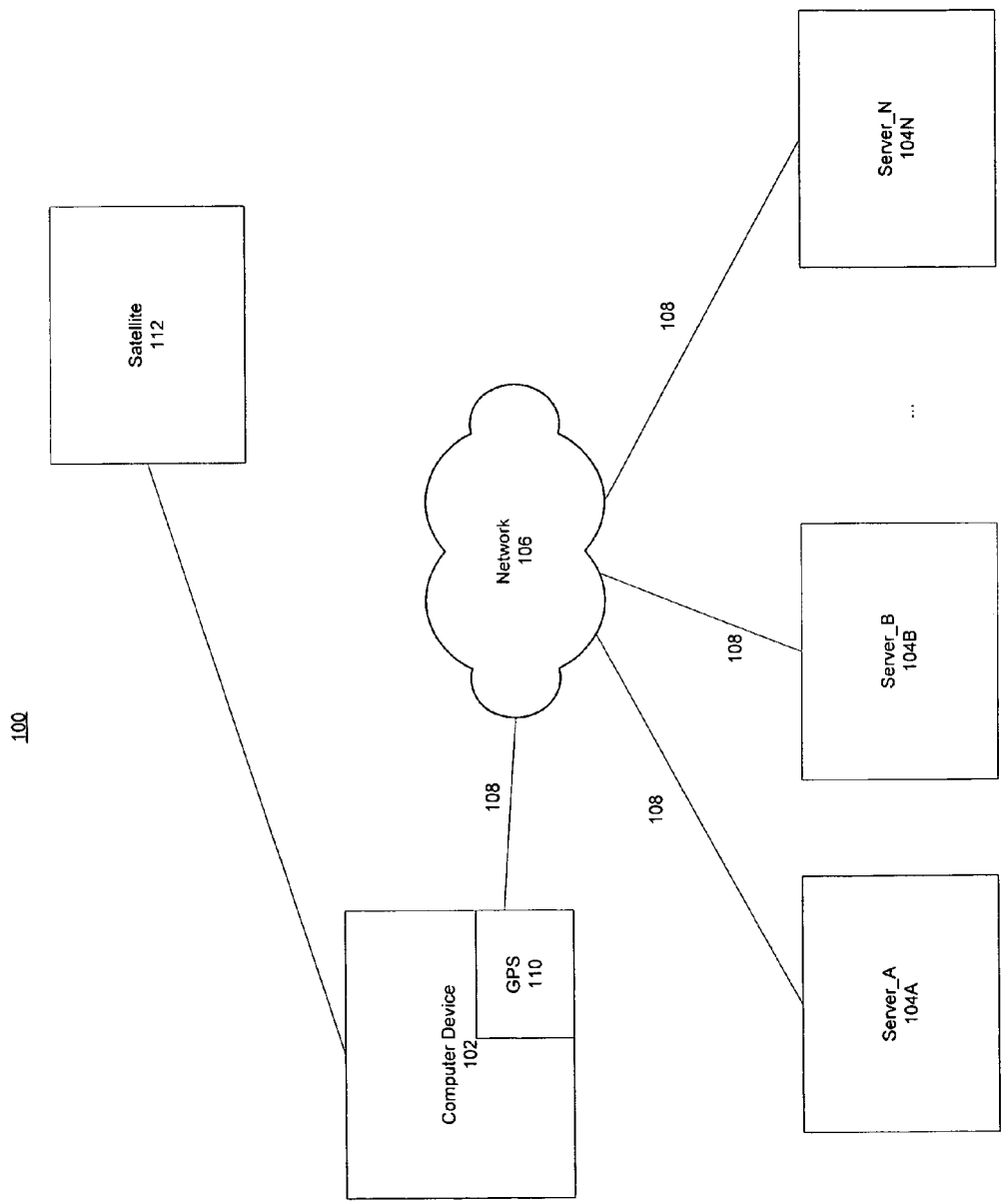
FIG. 1 illustrates an overall system diagram, according to various embodiments of the invention.

FIG. 1 illustrates a system 100, in accordance with various embodiments of the invention. System 100 may comprise a computer device 102 including a GPS component 110. Computer device 102 may communicate with one or more servers GPS satellites 112.

In system 100, a computer device 102 may require access to information stored at one or more servers, such as servers 104A-N. Servers 104A-N may be located in various remote geographic locations. Computer device 102 may communicate with one or more of servers 104A-N over a network 106 via one or more communications links 108.

Computer device 102 may be any computer device such as, for example, a laptop computer, a PDA, a Blackberry, an Internet enabled wireless/cellular telephone, and/or any other computer device. Network 106 may include, for example, the Internet, an intranet, a local area network (LAN), and/or other networks. Communications link 108 may include, for example, a DSL connection, an Ethernet connection, and ISDN connection, a wireless connection, and/or other communications links.

To automatically retrieve its location and to automatically connect to the nearest server, computer device 102 may include a global positioning device 110. Global positioning device 110 may be integrated with computer device 102, as illustrated in FIG. 1, or may alternatively be a separate device accessible by computer device 102. Global positioning device 110 may communicate with one or more satellites such as satellite 112 to retrieve location information. Global positioning device 110 may be or may interface to any type of global positioning system such as, for example, NAVSTAR GPS, LORAN positioning system, a global paging system, and/or other global positioning systems. As used herein, GPS refers to these and other methods of global positioning.

Figure 2:
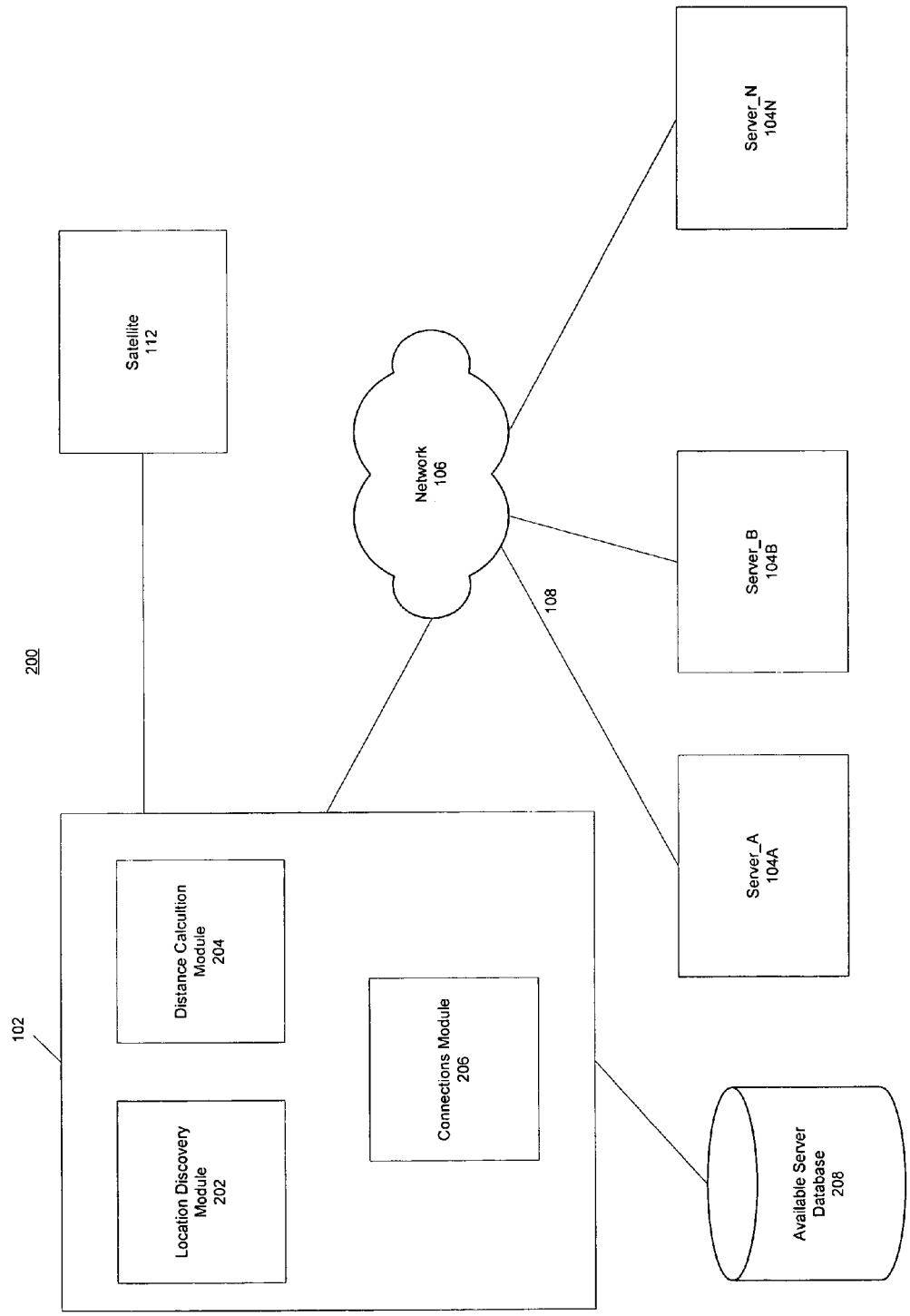
FIG. 2 illustrates a system for detecting a nearest network resource, according to various embodiments of the invention.

FIG. 2 illustrates a system 200 for automatically detecting and connecting to a nearest network server. As depicted in FIG. 2, computer device 102 may include a plurality of modules for implementing various embodiments of the invention. For example, in some embodiments, a location discovery module 202 may be provided within computer device 102. Location discovery module 202 may be configured to interface with satellite 112 to determine the geographic location of computer device 102. Similarly, a distance calculation module 204 may be provided within computer device 102 that is configured to calculate a distance between computer device 102 and one or more servers, such as server 104A-N.

In addition, a list of servers storing particular network data may be stored in database 208 communicatively coupled to computer device 102. A connections module 206 may also be provided within computer device 102 that facilitates and manages connections to one or more servers, such as servers 104A-N.

Location discovery module 202 may operate by sending a request to retrieve GPS coordinates from satellite 112. In turn, satellite 112 may respond by presenting location discovery server 202 with the GPS coordinates of computer device 102. According to some embodiments of the invention, the GPS coordinates may be translated into a physical street address, or other location-identifying data such as a zip code or area code.

The location information may then be used by distance calculation module 204 to calculate the distance to the nearest network server. Distance calculation module 204 may use any provided location parameter (GPS coordinates, address, zip code, area code) to determine the distance between each network server and computer device 102 using known mapping/direction finding techniques. According to some embodiments of the invention, servers 104A-N may be ranked in order of shortest distance from computer device 102.

As noted above, connections module 206 may be provided for managing the connection to one of servers 104A-N. Based on the calculations performed by distance calculation module 204, connections module 206 may attempt to connect to the closest network server. According to some embodiments of the invention, connections module 206 may include a mechanism that determines the response time for a preselected number of network servers having the shortest distance from computer device 102. By using the calculated distance and the response time, connection module 206 may connect to the network server that is both geographically closest and has the shortest response time.

Figure 3:
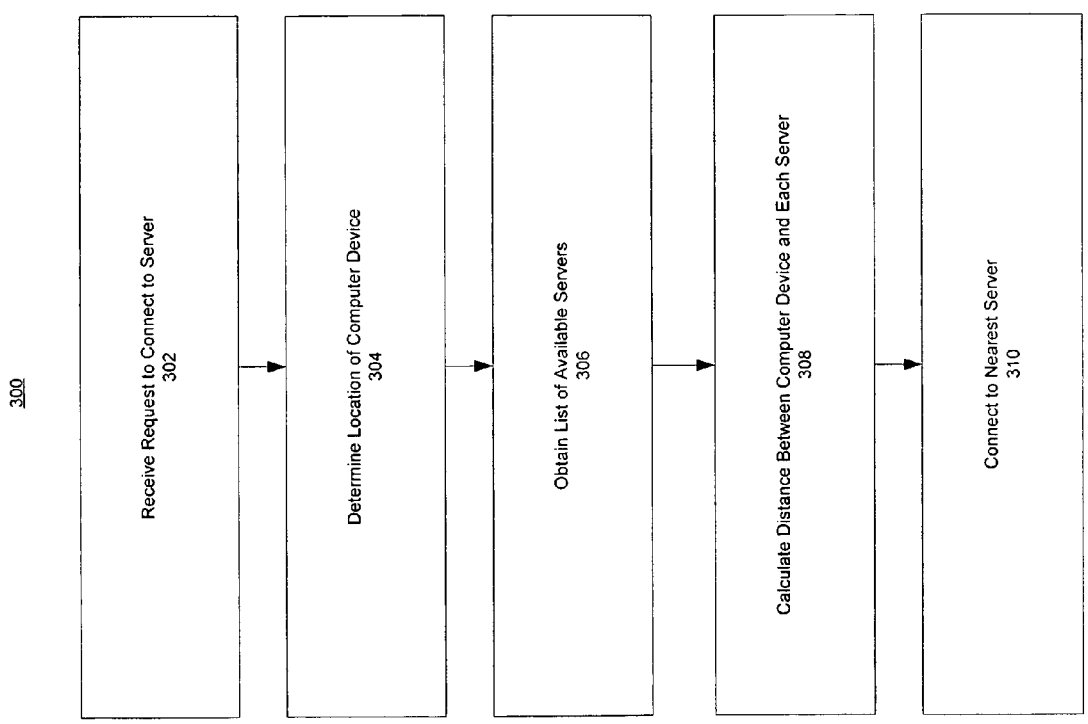
FIG. 3 illustrates a flowchart for determining a nearest network server, according to various embodiments of the invention.

FIG. 3 illustrates a process 300, configured to determine a nearest network server, in accordance with various embodiments of the invention. As illustrated at operation 302, a request may be received at computer device 102 from a user to connect computer device 102 to a network in order to obtain data or other information. The data or other information may be located at one or more servers located in multiple geographic locations. Upon receipt of the request, the computer device 102 may be connected to the nearest network server in which the required data or other information is located.

Computer device 102 may be, for example, a mobile device which accesses a network from various locations. As illustrated at operation 304 of process 300, the location of computer device 102 may be obtained using location discovery module 202. Location discovery module 202 may send a request to GPS satellite 112 to obtain GPS location coordinates for computer device 102. In some embodiments of the invention, the GPS coordinates may be translated into other location-defining parameters. For example, the GPS coordinates may be translated into a complete street address, a zip code, an area code, and/or other locations defining parameters.

As illustrated at operation 306, a list of network servers may be obtained. According to some embodiments of the invention, the list of network servers may be maintained in database 208, stored at computer device 102. The list of servers may include, for example, a server name, GPS coordinates, a physical address for the server, a phone number associated with the server's location, and/or other information. According to alternate embodiments of the invention, the list of network servers may also be obtained by querying a dedicated server. According to some embodiments of the invention, computer device 102 may be a wireless device having GPS coordinates of known servers or access points preprogrammed. It will be appreciated that other methods of determining available servers may be employed.

Once the location of computer device 102 has been determined and the list of network servers has been obtained, the distance between computer device 102 and each server may be calculated, as illustrated at operation 308 of process 300. Distance calculation module 204 may use any provided location parameter to determine distances between computer device 102 and each server. For example, if GPS coordinates are used, distance calculation module 302 may determine the difference between the coordinates of computer device 102 and each server. If a zip code is used, distance calculation module 308 may determine the distance between the zip codes using any known mapping techniques.

As illustrated at operation 310, computer device 102 may be then connected to the nearest network server. Connections module 206 may attempt to connect to the network server having the shortest calculated distance from computer device 102. If the network server having the shortest calculated distance cannot be reached, connections module 206 may attempt to connect to the network server having the next shortest distance. This process may be repeated until a connection has been established.

As described above, using both geographic distance and response time to determine an appropriate server for connection may result in a stronger connection, such as, for example, a connection that is more stable, uses less bandwidth, has less risk for drop-offs, and/or is otherwise a stronger connection. According to some embodiments of the invention, connections module 206 may also calculate a response time for a predetermined number of network servers having the shortest distance from computer device 102. For example, connection module 206 may perform a ping operation to determine the response time of the three network servers having the shortest distance from computer device 102. Once the response times have been determined for the predetermined number of network servers having the shortest distance, connection module 206 may attempt to connect to the network server having the shortest response time of the predetermined network servers.

The system and method of the present invention may also be used to discover the location of both fixed and moving resources. For example, a computer device located in a particular office may normally connect to a particular server when accessing data. However, if the particular server becomes unavailable or service is disrupted, GPS may be used to determine a nearest backup server.

Figure 4:
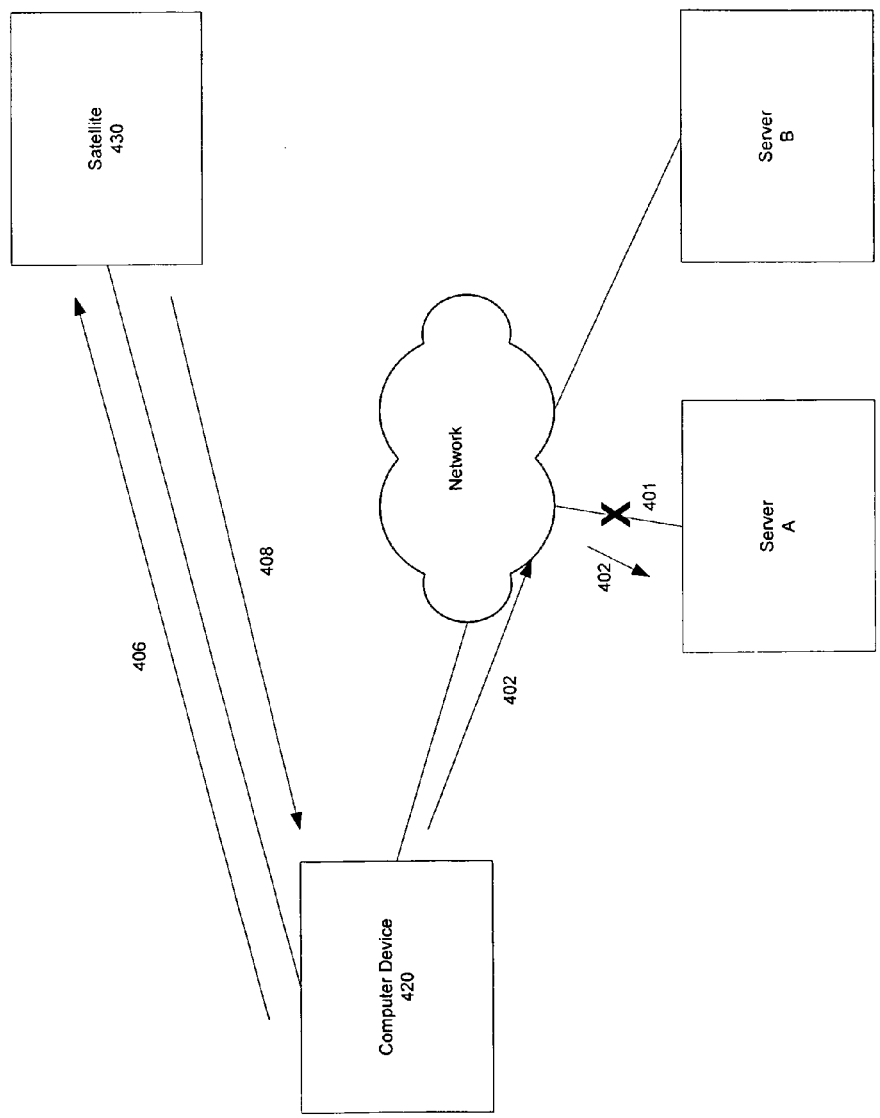
FIG. 4 illustrates a system flow diagram, according to various embodiments of the invention.

FIG. 4 illustrates a system diagram for using GPS to locate a fixed target and calculate a nearest network resource, according to various embodiments of the invention. GPS enabled computer device 420 may normally communicate with Server A to access data by sending a request 402. As indicated by reference numeral 404, the connection between server A and computer device 420 may become unavailable. For example, Server A may be offline for maintenance, experiencing unusually high connectivity, or otherwise unavailable to computer device 420. When computer device 420 learns that Sever A is unavailable, a request 406 may be sent to one or more GPS satellites, such as satellites 430, to determine the location of computer device 420. GPS satellite 430 may respond by providing GPS coordinates, as indicated by reference numeral 408. Operation may then continue in a manner similar to that described above in relation to moving resources. A determination may be made of other servers containing the desired data, a calculation may be performed to determine the nearest server, and a connection may be made to connect to the server being the shortest distance from computer device 420.

While described above in the context of choosing an appropriate network server for obtaining stored data, the techniques of the present invention may be applied in any situation in which a user may choose from a list of available computer resources. For example, files such as software downloads are often mirrored on several FTP sites worldwide. According to various embodiments of the invention, GPS may be used to determine an appropriate FTP site, rather than requiring the user to make a selection. If a user requests to download a file that is mirrored on multiple FTP sites, location discovery module 202 may determine the location of the user device.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method for determining a nearest network resource using global positioning system (GPS) coordinates, comprising:
    receiving, at a mobile computer device, a request to establish a connection with a network to access data stored on the network, wherein the mobile computer device is a laptop computer device operated by a user;
    obtaining, at the mobile computer device, GPS coordinates indicating a geographic location for the mobile computer device from one or more GPS satellites;
    obtaining, at the mobile computer device, zip codes for the multiple servers maintained in a list on the mobile computer device, wherein the multiple servers storing the requested data on the network;
    calculating, on the mobile computer device, distances from the geographic location for the mobile computer device to geographic locations for the multiple servers in the list by resolving a mobile device zip code for the GPS coordinates on the mobile device and calculating the distances from the mobile device zip code to the zip codes maintained in the list on the mobile device for the multiple servers;
    calculating, on the mobile computer device, response times for a subset of the multiple servers in the list for which the calculated distances from the geographic location for the mobile computer device are shortest, wherein the subset of the multiple servers in the list includes a plurality of the multiple servers in the list; and
    establishing, on the mobile computer device, the connection to one of the plurality of servers in the subset of the multiple servers for which the calculated response time is shortest, wherein the mobile computer device accesses the data stored on the network from the one of the plurality of servers in the subset of the multiple servers for h the calculated response time is shortest.

2. The computer implemented method of claim 1, wherein calculating the response times for the subset of the multiple servers in the list for which the calculated distances are shortest further comprises performing a plurality of ping operations for the subset of the multiple servers to calculate the response times for the plurality of servers in the subset of the multiple servers.

3. The compute implemented method of claim 1, further comprising:
    establishing, on the mobile computer device, the connection to another one of the plurality of servers in the subset of the multiple servers for which the calculated response time is next shortest in response to the mobile computer device determining that the one of the plurality of servers with the shortest calculated response time cannot be reached; and
    accessing, by the mobile computer device, the data stored on the network from the other server in response to the mobile computer device failing to establish the connection to the one of the plurality of servers for which the calculated response time is shortest.

4. The computer implemented method of claim 1, wherein the mobile computer device receives the request to establish the connection with the network in response to a resource that normally stores the data on the network becoming unavailable, or to select a nearest download site among multiple mirrored download sites that store the data on the network.

5. A system for determining a nearest network resource using global positioning system (GPS) coordinates, comprising:
    a mobile computer device configured to receive a request to establish a connection with a network to access data stored on the network, wherein the mobile computer device is a laptop computer device operated by a user;
    GPS device accessible to the mobile computer device, wherein the GPS device is configured to obtain GPS coordinates indicating a geographic location for the mobile computer device from one or more GPS satellites and provide the GPS coordinates obtained from the one or more GPS satellites to the mobile computer device;

a list maintained on the mobile computer device, wherein the list includes zip codes for multiple servers storing the requested data on the network;

a distance calculation module stored on the mobile computer device, wherein the distance calculation module is configured to calculate distances from a mobile device zip code resolved by the mobile computer device for the GPS coordinates to the zip codes maintained in the list for the multiple servers; and a connections module stored on the mobile computer device, wherein the connections module is configured to:

calculate, on the mobile device, response times for a subset of the multiple servers in the list for which the calculated distances from the geographic location for the mobile computer device are shortest, wherein the subset of the multiple servers in the list includes a plurality of the multiple servers in the list; and establish, on the mobile computer device, the connection to one of the plurality of servers in the subset of the multiple servers for which the calculated response time is shortest, wherein the mobile computer device accesses the data stored on the network from the one of the plurality of servers in the subset of the multiple servers for which the calculated response time is shortest.

6. The system of claim 5, wherein to calculate the response tunes for the subset of the multiple servers in the list for which the calculated distances are shortest, the connections module is further configured to perform a plurality of ping operations for the subset of the multiple servers to calculate the response times for the plurality of servers in the subset of the multiple servers.

7. The system of claim 5, wherein to calculate the distances from the geographic location for the mobile computer device to the geographic locations for the multiple servers in the list, the distance calculation module is further configured to calculate differences between GPS coordinates associated with the geographic locations for the multiple servers in the list and the GPS coordinates indicating the geographic location for the mobile computer device, wherein smaller differences indicate shorter distances from the geographic location for the mobile computer device.

8. The system of claim 5, wherein the connections module is further configured to:

establish, on the mobile computer device, the connection to another one of the plurality of servers in the subset of the multiple servers for which the calculated response time is next shortest in response to the connections module determining that the one of the plurality of servers with the shortest calculated response time cannot be reached; and access, by the mobile computer device, the data stored on the network from the other server in response to the connections module failing to establish the connection to the one of the plurality of servers for which the calculated response time is shortest.

9. The system of claim 5, wherein the mobile computer device receives the request to establish the connection with the network in response to a resource that normally stores the data on the network becoming unavailable, or to select a nearest download site among multiple mirrored download sites that store the data on the network.

10. A mobile computer device for determining a nearest network resource using global positioning system (GPS) coordinates, comprising:

a GPS device integrated within mobile computer device, wherein the GPS device is configured to obtain GPS coordinates indicating a geographic location for the mobile computer device from a GPS satellite system in response to the mobile computer device receiving a request to establish a connection with a network to access data stored on the network, wherein the mobile computer device is a laptop computer device operated by a user;

a distance calculation module configured to calculate, on the mobile device, distances from the geographic location for the mobile computer device to geographic locations for multiple servers that store the requested data on the network by resolving, on the mobile device, a mobile device zip code for the mobile device and zip codes maintained in a list on the mobile device for the multiple servers and calculating each of the calculated distances as a particular distance between the mobile device zip code and a particular one of the zip codes for a particular one of the multiple servers; and a connections module configured to:

calculate, on the mobile device, response times for a subset of the multiple servers for which the calculated distances from the geographic location for the mobile computer device are shortest, wherein the subset of the multiple servers includes a plurality of the multiple servers; and establish, on the mobile computer device, the connection to one of the plurality of servers in the subset of the multiple servers for which the calculated response time is shortest, wherein the mobile computer device accesses the data stored on the network from the one of the plurality of servers in the subset of the multiple servers for which the calculated response time is shortest.

11. The mobile computer device of claim 10, wherein to calculate the response times for the subset of the multiple servers for which the calculated distances are shortest, the connections module is further configured to perform a plurality of ping operations for the subset of the multiple servers to calculate the response times for the plurality of servers in the subset of the multiple servers.

12. The mobile computer device of claim 10, wherein the connections module is further configured to:

establish, on the mobile computer device, the connection to another one of the plurality of servers in the subset of the multiple servers for which the calculated response time is next shortest in response to the connections module determining that the one of the plurality of servers with the shortest calculated response time cannot be reached; and access, by the mobile computer device, the data stored on the network from the other server in response to the connections module failing to establish the connection to the one of the plurality of servers for which the calculated response time is shortest.

13. The mobile computer device of claim 10, wherein the mobile computer device receives the request to establish the connection with the network in response to a resource that normally stores the data on the network becoming unavailable, or to select a nearest download site among multiple mirrored download sites that store the data on the network.

* * * * *

UNITED STATES PATENT AND TRADEMARK OFFICE
CERTIFICATE OF CORRECTION

PATENT NO. : 9,460,094 B1  
APPLICATION NO. : 11/030904  
DATED : October 4, 2016  
INVENTOR(S) : Nosack et al.

It is certified that error appears in the above-identified patent and that said Letters Patent is hereby corrected as shown below:

In the Claims

In Column 6, Line 25, in Claim 1, delete "h" and insert --which--, therefor

In Column 6, Line 33, in Claim 3, delete "compute" and insert --computer--, therefor In Column 6, Line 61, in Claim 5, delete "GPS" and insert --a GPS--, therefor In Column 7, Line 28, in Claim 6, delete "tunes" and insert --times--, therefor Signed and Sealed this  
Twentieth Day of March, 2018

Andrei Iancu  
*Director of the United States Patent and Trademark Office*